United States Patent [19]

McCrae et al.

[11] 3,987,023

[45] Oct. 19, 1976

[54] AZO PIGMENT METAL COMPLEXES

[75] Inventors: James McGeachie McCrae, Stewarton; Christopher Midcalf, Kilbarchan, both of Scotland

[73] Assignee: Ciba-Geigy Corporation, Ardsley, N.Y.

[22] Filed: Sept. 18, 1974

[21] Appl. No.: 507,016

[30] Foreign Application Priority Data

Sept. 22, 1973 United Kingdom............ 44555/73

[52] U.S. Cl.............................. 260/147; 260/162; 260/149; 260/146 R; 260/151
[51] Int. Cl.$^2$................... C09B 45/18; C09B 45/22
[58] Field of Search............................ 260/162, 147

[56] References Cited
UNITED STATES PATENTS

| | | | |
|---|---|---|---|
| 2,864,814 | 12/1958 | Rieckstuhl | 260/147 |
| 3,538,073 | 11/1970 | Mack et al. | 260/162 X |

*Primary Examiner*—Allen B. Curtis
*Attorney, Agent, or Firm*—Vincent J. Cavalieri

[57] ABSTRACT

A tri- or tetra-dentate metal complex having the formula

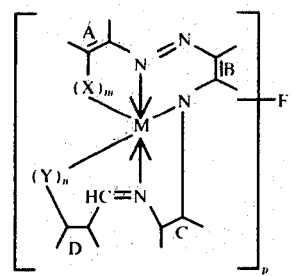

wherein A is an aryl or heterocyclic residue, B is an aliphatic, aryl or heterocyclic residue, C is an alkylene, cycloalkylene, cycloalkenylene, an aryl or heterocyclic residue, D is an alkyl, an alkylene, an aryl or a heterocyclic residue, X and Y are the same or different and each is an O, S, $CO_2$ or N—R residue wherein R is an alkyl, cycloalkyl, aryl, aralkyl or heterocyclic residue or R is the atoms required to complete, together with the residue A or D, a heterocyclic residue, $m$ and $n$ are each 0 or 1 with the proviso that the sum of $m$ and $n$ is at least 1, M is a Cu, Zn or Ni metal atom, $p$ is 1 or 2 and when $p$ is 1, F is a hydrogen atom attached to one of the residues A, B, C and D and when $p$ is 2, F is either a direct bond linking two residues A, B, C and D or is an alkylene, arylene or aralkylene residue linking two residues A, B, C and D which is useful for coloring organic material preferably a lacquer, paint or printing ink.

2 Claims, No Drawings

AZO PIGMENT METAL COMPLEXES

The present invention relates to new pigments and, in particular, to new metal azo pigments and to processes for producing these pigments.

According to the present invention, there is provided a tri- or tetradentate metal complex having the formula:

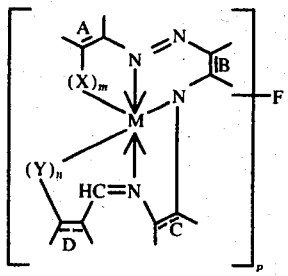

wherein A is an aryl or heterocyclic residue, B is an aliphatic aryl or heterocyclic residue, C is an alkylene, a cycloalkylene, a cycloalkenylene, an aryl or a heterocyclic residue, D is an alkyl, an alkylene, an aryl, or a heterocyclic residue, X and Y are the same or different and each is an O, S, $CO_2$ or N—R residue wherein R is an alkyl, cycloalkyl, aryl, aralkyl or heterocyclic residue or R is the atoms required to complete, together with residue A or D, a heterocyclic residue, $m$ and $n$ are each 0 or 1 with the proviso that the sum of $m$ and $n$ is at least 1, M is a Cu, Zn or Ni metal atom and P is 1 or 2 and when $p$ is 1, F is a hydrogen atom attached to one of the residues. A, B, C and D and when $p$ is 2, F is either a direct bond linking two residues A, B, C and D or F is an alkylene, arylene or aralkylene residue linking two residues A, B, C and D.

A preferred group of metal complex compound according to the present invention are those having the formula:

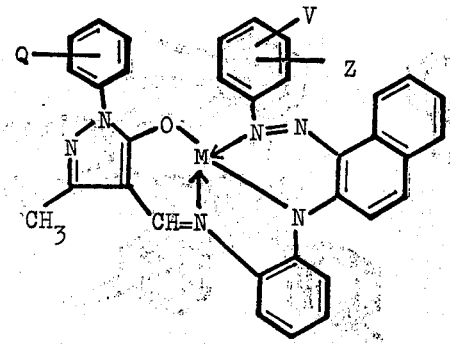

or the formula:

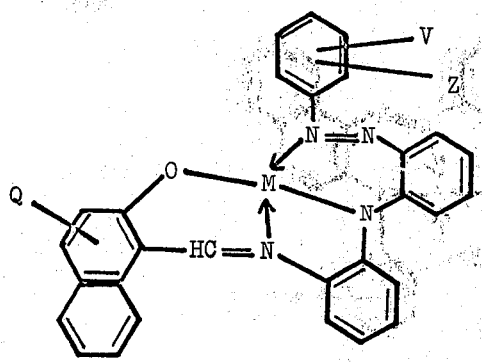

wherein M has its previous significance and V, Z and Q are the same or different and each is hydrogen, nitro or an alkyl or alkoxy residue having from 1 to 4 carbon atoms.

The bond ==== in the residue C and/or D is intended to make it clear that this bond can be either a single bond or a double bond.

When one or more of A, B, C, D and R is an aryl residue, then this residue preferably contains from 6 to 14 carbon atoms and may consist of a single aromatic ring or two or more fused aromtic rings. The aryl residue may be unsubstituted or substituted with one or more groups which do not impart water-solubility to the complex compound of formula I for instance alkyl, alkoxy, carboxyalkyl or alkyl-carbamoyl groups each having from 1 to 4 carbon atoms in the alkyl moiety, arylcarboxyarylamide, arylcarbamoyl groups, nitro groups or halogen atoms. Preferred examples of aryl residues A, B, C, D and R are phenyl and naphthyl residues.

When one or more of A, B, C, D and R is a heterocyclic residue, this residue may be either unsubstituted or substituted with one or more of the non-water solubilising groups described hereinbefore. A preferred heterocyclic residue A,B,C,D or R is the pyrazol-5-one residue.

When B is an aliphatic residue, it may be the residue of any aliphatic coupling component which is capable of coupling with a diazonium salt. For instance, the aliphatic residue may be a 1-methyl-2(anilinocarbonyl) ethylene residue or a derivative thereof.

In compounds of formula I, one or both of C and D may be an alkylene residue, this residue preferably containing from 1 to 20, more preferably from 1 to 12 carbon atoms. Examples of such preferred alkylene residues are 1,2-ethylene, 1,2-propylene, 2,3-butylene, 3,4-hexylene and 4,5-octylene residues, the 1,2-ethylene residue being preferred.

Cycloalkylene residues C are preferably 1,2-cyclopentylene and 1,2-cyclohexylene residues.

R is a monovalent group and may be an alkyl residue having from 1 to 20, preferably 1 to 12 carbon atoms, such as a methyl, ethyl, propyl, butyl, hexyl, octyl, decyl or dodecyl residue; a cycloalkyl residue having 5 to 6 carbon atoms; an aryl residue having from 6 to 14 carbon atoms, preferably a phenyl or naphthyl residue; an aralkyl residue having from 7 to 12 carbon atoms, especially a benzyl residue; or a heterocyclic residue such as a pyrazol-5-one residue. D is a monovalent residue and may be an alkyl residue, an aryl or heterocyclic residue. Examples of typical aryl and heterocyclic residues D are the monovalent counterparts to the aryl and heterocyclic residues D described hereinbefore. When n is O, D may be an alkyl residue, it preferably contains from 4 to 20, especially 4 to 12 carbon atoms, such as methyl, ethyl, propyl, butyl, hexyl, octyl, decyl and dodecyl residues.

Preferably, $p$ is 1 and F is a hydrogen atom attached to one of the residues A, B, C or D. However, when $p$ is 2, F may be either a direct bond linking two residues A, B, C, or D, for instance 1,4-phenylene or 4,4'-biphenylene residues, or F may be an alkylene, arylene or aralkylene residue linking two residues A, B, C or D.

Specific classes of compounds of formula I which are of particular interest include those having the following formulae:

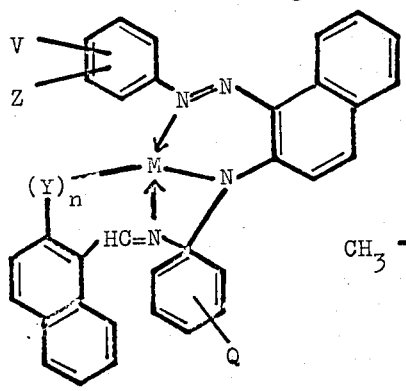
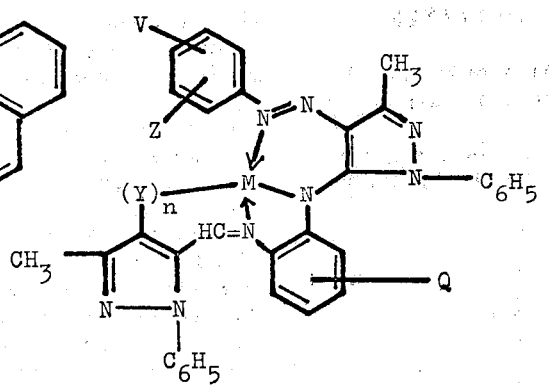
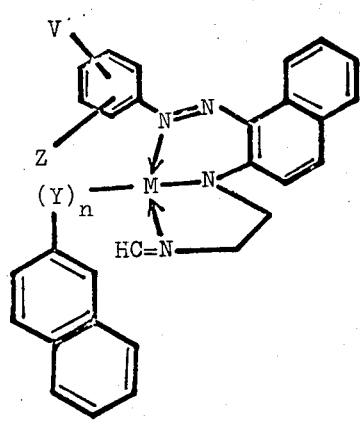
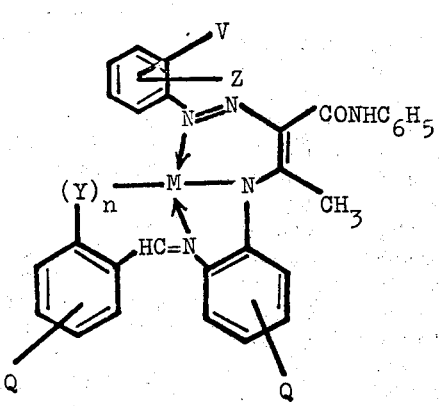
wherein Y has its previous significance but is preferably 0, and n is 1.
Other specific classes of compound of formula I of interest are those having the following formulae:
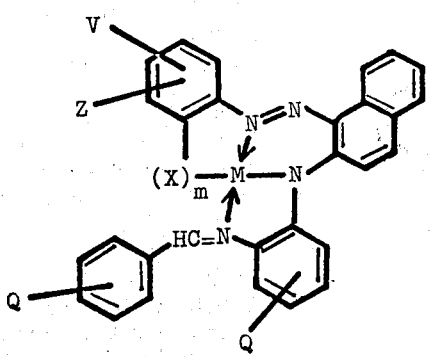
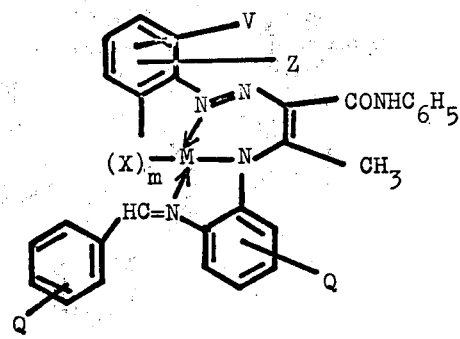
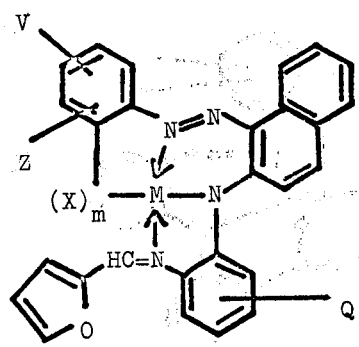

wherein X has its previous significance but is preferably 0 and m is 1.

The present invention also provides a process of producing a compound of formula I comprising metallising a compound having the formula:

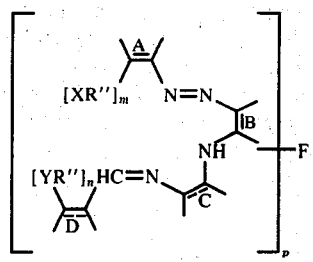

wherein A, B, C, D and X, Y, F, n, p and m have their previous significance and R" is hydrogen or a methyl residue.

The metallisation of the compound of formula II may be carried out directly in the reaction medium used to produce the compound of formula I. Alternatively, the compound of formula II may be separated from its crude reaction mixture, washed free from impurities and re-suspended, prior to metallisation, in a solvent which may be the same as, or different from, any solvent used in the production of the compound of formula II.

The matallisation may be effected using a solution or suspension of any suitable salt or complex of the metal M. For instance, when the metallisation is a coppering process, a suspension of a copper salt in an organic solvent or an aqueous solution of a copper salt such as copper acetate, cuprammonium sulphate or sodium cuprotartrate may be used. In the case of metallisation with zinc, an aqueous of organic solution of a zinc salt such as zinc sulphate may be used. When the metallisation is effected using nickel, it is convenient to use a solution of nickel acetate tetra hydrate in methyl Cellosolve.

Many of the compounds of formula II are novel and these compounds may be formed by methods known per se.

The compounds of formula II may be produced, for example, by coupling a diazonium salt of a compound having the formula:

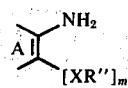

wherein A, X, R" and m have their previous significance, with a compound having the formula:

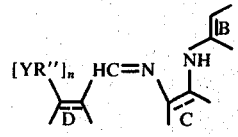

wherein B,C,D,Y,R" and n have their previous significance.

The compounds of formula III and IV are known per se.

The present invention also provides a second process of producing a compound of formula I comprising reacting a compound having the formula:

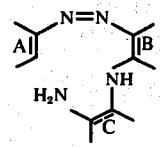

or a compound of formula:

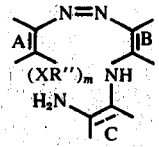

wherein A,B,C,X,R" and m have their previous significance, with an aldehyde having the formula:

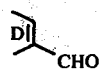

or the formula:

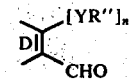

wherein D,Y,R" and n have their previous significance, and then metallising the reaction product obtained.

The starting materials of formulae VII and VIII are compounds well-known per se.

Many of the compounds of formula V and VI are new and may be produced by methods known per se. They may be produced, for example, by coupling a diazotized amine of formula:

or formula:

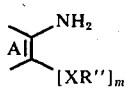     X with a coupling component of formula:

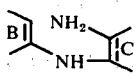     XI

Compounds of formula IX and X suitable for use in the present invention include:
   aniline
   2-,3- and 4- chloroaniline
   2-,3- and 4- nitroaniline
   2-,3- and 4- methoxyaniline
   2-,3- and 4- aminopiperidine
   8- aminoquinoline
   7- aminobenzofuran
   2- hydroxyaniline
   2- methoxyaniline
   2- hydroxy -5- chloroaniline
   2- hydroxy -4- nitroaniline
   2- methoxy -4- nitroaniline
   2- methoxy -4- and 5- methylaniline
   2- methoxy -4- nitroaniline
   2- hydroxy -5- chloroaniline Examples of compounds of formula XI suitable for use in the present invention include:
   N-(2-aminophenyl)-β-naphthylamine
   N-(2-amino-4-chlorophenyl)-β-naphthylamine
   N-(2-amino-4-nitrophenyl)-β-naphthylamine
   N(naphthyl)ethylenediamine
   N(naphthyl)propylenediamine
   N(naphthyl)-2-methyl-ethylenediamine
   N(naphthyl)-1-phenyl-3-methyl-5-amino pyrazoline
   N-(aminoethyl)-β-naphthylamine
   N-phenyl-3-(2'-aminoanilino)-but-2-enoic acid amide As examples of aldehydes of VII and VIII there may be mentioned the following:
   benzaldehyde
   1-naphthaldehyde
   2-hydroxy-1-naphthaldehyde
   4-formyl pyridine
   1-phenyl-3-methyl-4-formyl pyrazol-5-one Because of their insolubility in the reaction medium, the compounds of formula I can easily be isolated from the reaction mixture by filtration.

The compounds of formula I may be employed as pigments directly after production; that is after they have been filtered off from their crude reaction liquors and dried. Alternatively, they may be first processed using known wet or dry conditioning techniques such as grinding, either alone or in the presence of a water-soluble salt or other medium which can be subsequently removed, for instance by washing.

Accordingly, the present invention further provides a method of colouring organic material comprising incorporating into the organic material a minor proportion of a compound of formula I. The present invention also includes organic material so coloured.

The proportion of the compound of formula I employed to colour organic material according to the invention may be varied within a wide range, but is normally within the range of from 0.1 to 10%, preferably from 0.5 to 5% by weight based on the total weight of organic material to be coloured.

Organic materials which may be coloured according to the invention include high molecular organic material, for example, cellulose ethers and cellulose esters such as ethyl cellulose, acetylcellulose and nitrocellulose, polyamides, polyurethanes and polyesters, natural and synthetic resins such as aminoplasts, especially ureaformaldehyde and melamine-formaldehyde resins, alkyd resins, phenoplasts, polycarbonates, polyolefines such as polystyrene, polyvinyl chloride, polyethylene, polypropylene, polyacrylonitrile, polyacrylic acid esters, rubber, casein, silicone and silicone resins, individually or in admixture. It does not matter whether these high molecular compounds are in the form of plastic masses or melts or in the form of spinning solutions. The compounds of formula I are of particular interest, however, for the colouration of lacquers, paints and printing inks.

Depending upon the end use, it may be advantageous to employ the compounds of formula I as a toner or in the form of a pigment preparation.

As a rule, the compounds of formula I are characterised by excellent solvent and light fastness properties and high colour strength.

Some Examples will now be given, in which parts and percentages are by weight.

Preparation of ligands

EXAMPLE 1

57 parts of 2-hydroxy-3-naphthoic acid and 33 parts of o-phenylene diamine were added to a solution of 210 parts of sodium bisulphate in 1200 parts of water containing 135 parts of a 20% sodium hydroxide solution. The resulting suspension was heated under reflux conditions for 20 hours, allowed to cool and 300 parts of methanol added. The off-white solid was filtered off, washed with cold water and dried at 55° C.

Thus were obtained, 45 parts of a fawn solid having a melting point of 99°–100° C and having the formula:

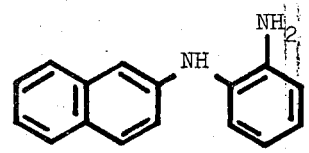

EXAMPLE 2 to 11

27.9 parts of aniline was stirred into a mixture of 77.5 parts of concentrated hydrochloric acid and 100 parts of cold water, the mixture cooled to 0°–5° C and maintained at this temperature during the addition of a solution of 20.7 parts of sodium nitrite in 40 parts of water. The resulting diazonium chloride solution was added over 15 minutes to a cold solution of 78 parts (N-(2-aminophenyl)-β-naphthylamine in 800 parts of glacial acetic acid. After the coupling, 500 parts of water were added causing precipitation of dark red solid. The red suspension was stirred for 60 minutes, filtered, the solid washed with 50% acetic acid solution, then with water and dried at 55° C.

Thus were obtained, 100 parts of a red-brown solid having a melting point of 143°–4° C and having the structure:

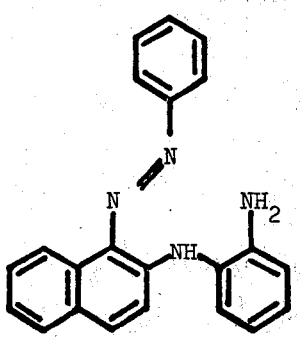

Using the procedure described in Example 21 the amines and coupling components showing in Table I were reacted together to give the corresponding compounds of formula V or VI of the invention, the melting points of which are also shown in Table I.

TABLE I

| Example | Amine | Coupling Component | M.pt.° C |
|---|---|---|---|
| 3 | | | 215–218 |
| 4 | | | 185–187 |
| 5 | | | 214–215 |
| 6 | | | 129–130 |
| 7 | | | 130–131 |
| 8 | | | 168–169 |

TABLE I-continued

| Example | Amine | Coupling Component | M.pt.° C |
|---|---|---|---|
| 9 | 4-nitroaniline | 4-((phenylimino)methyl)-3-methyl-5-hydroxy-1-phenylpyrazole coupled with 2-naphthylamine | 193–194 |
| 10 | aniline | N-(2-naphthyl)-p-phenylenediamine | 153–156 |
| 11 | aniline | 1-((2-(2-naphthylamino)ethyl)iminomethyl)-2-naphthol | 182–183 |

EXAMPLES 12 to 21

33.8 parts of the product of Example 2 and 17.2 parts of 2-hydroxy-1-naphthaldehyde were refluxed for 2 hours in 500 parts of ethanol. The orange-red solid was filtered, washed with ethanol and dried at 55° C.

Thus were obtained, 44.28 parts of an orange-red solid having a melting point of 208°–9° C and having the structure:

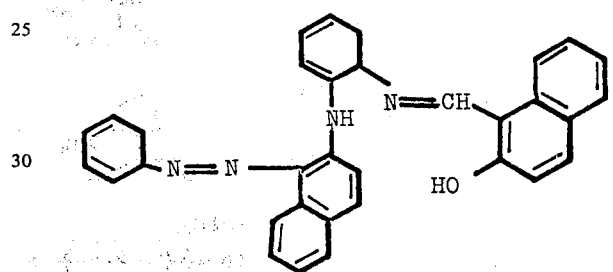

Using the procedure described in Example 12, the various aldehydes and amines shown in Table II were reacted together to form the corresponding compounds of formula II of the invention, the melting-points of the compounds of formula II also being shown in Table II.

TABLE II

| Example | Amine | Coupling Component | M.pt.° C |
|---|---|---|---|
| 13 | benzaldehyde | 5-methyl-2-((2-(4-aminophenylamino)-1-naphthyl)azo)benzoic acid | >300 |
| 14 | benzaldehyde | 2-((2-(4-aminophenylamino)-1-naphthyl)azo)benzoic acid | 242–243 |
| 15 | 4-formyl-3-methyl-5-hydroxy-1-phenylpyrazole | N-(2-aminoethyl)-2-naphthylamine | 195–198 |

TABLE II-continued

| Example | Amine | Coupling Component | M.pt.°C |
|---|---|---|---|
| 16 | OHC-pyrazole(CH3, HO, N-tolyl) | 2-naphthyl-NH(CH2)2NH2 | 239–241 |
| 17 | salicylaldehyde (CHO, OH) | 2-naphthyl-NH(CH2)2NH2 | 120–121 |
| 18 | 2-hydroxy-1-naphthaldehyde | 2-naphthyl-NH(CH2)2NH2 | 193–195 |
| 19 | OHC-pyrazole(CH3, HO, N-tolyl) | 2-naphthyl-NH-C6H4-NH2 | 197–198 |
| 20 | OHC-pyrazole(CH3, HO, N-phenyl) | 2-naphthyl-NH-C6H4-NH2 | 228–229 |
| 21 | 2-hydroxy-1-naphthaldehyde | naphthyl(N=N-Ph)-NH-C6H4-NH2 | 203–205 |

Preparation of metal complexes

EXAMPLE 22 to 23

24.6 parts of the compound of Example 12 were dissolved in 150 parts of hot methyl Cellosolve and to this was added a solution of 10.0 parts of cupric acetate monohydrate dissolved in 50 parts dimethyl formamide followed by 100 parts of methyl Cellosolve. The resulting suspension was heated under reflux for 6 hours, filtered hot and the solid washed with 100 parts of hot methyl Cellosolve followed by 100 parts of ethanol and then dried.

In this way there were obtained, 26 parts of a solid a melting point not less than 300° C and having the formula

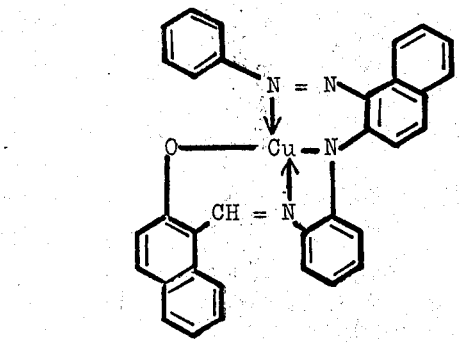

Using the procedure described in Example 22 the various ligands (compounds of formula II of the present invention) were metallised to give the products (compounds of formula I of the present invention) shown in Table III and characterized by their colour in lacquer — also provided in Table III.

TABLE III

| Example | LIGAND | PRODUCT | COLOUR IN LACQUER |
|---|---|---|---|
| 23 | | | brown |
| 24 | | | brown |
| 25 | | | brown |
| 26 | | | brown |
| 27 | | | brown |

TABLE III-continued

| Example | LIGAND | PRODUCT | COLOUR IN LACQUER |
|---|---|---|---|
| 28 | | | brown |
| 29 | | | red |
| 30 | | | green |
| 31 | | | blue |

TABLE III-continued

| Example | LIGAND | PRODUCT | COLOUR IN LACQUER |
|---|---|---|---|
| 32 | | | blue |
| 33 | | | blue |

What we claim is:

1. A tri- or tetra-dentate metal complex having the formula

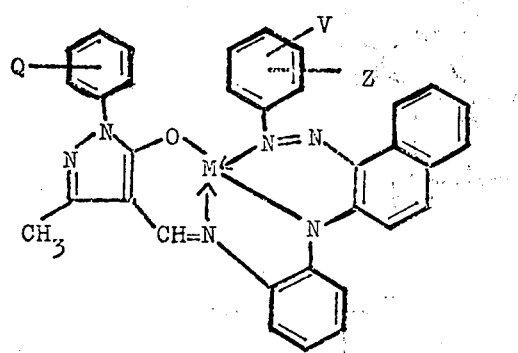

or

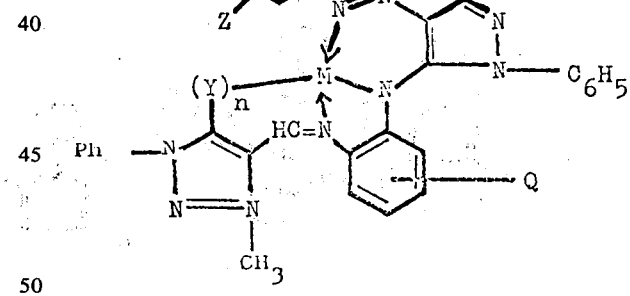

wherein M is Cu, Zn, or Ni; Y is O, S, $CO_2$ or N—R residue wherein R is alkyl, cycloalkyl, aryl, aralkyl, or heterocyclic residue; $n$ is 0 or 1; and V, Z and Q are the same or different and each is hydrogen, nitro, alkyl of 1–4 carbon atoms, or alkoxy of 1–4 carbon atoms.

2. The metal complex according to claim 1 wherein Y is O and $n$ is 1.

* * * * *